Patented Feb. 6, 1940

2,189,012

UNITED STATES PATENT OFFICE 2,189,012

MANUFACTURE OF ORGANIC COMPOUNDS

Geoffrey Lord and George Reeves, Spondon, near Derby, England, assignors to Celanese Corporation of America, a corporation of Delaware No Drawing. Application June 22, 1938, Serial No. 215,221. In Great Britain August 24, 1937

9 Claims. (Cl. 260—378)

This invention relates to the manufacture of organic compounds, and particularly to the conversion of leuco compounds to the corresponding oxidised compounds.

It is well known that the conversion to oxidised form of leuco derivatives of anthraquinone compounds which contain in one of the 1- and 4-positions an amino group and in the other of such positions an amino group or a hydroxy group may be effected by treating such leuco compounds with concentrated sulphuric acid. It has now been observed, however, that oxidation of such leuco compounds by treatment with commercial concentrated sulphuric acid is not entirely satisfactory since there is a tendency, during such oxidation, for amino groups to be removed from the anthraquinone compounds with the result that the products are redder in colour than would otherwise be the case.

It has now been discovered that the tendency of amino groups to be removed from the anthraquinone compounds in the above process may be eliminated or considerably reduced by employing, instead of commercial concentrated sulphuric acid (which contains a substantial amount of water, e. g., 3-5% of water), sulphuric acid which is substantially free from water. Thus there may be employed, for example, sulphuric acid monohydrate (i. e., substantially 100% sulphuric acid) or oleum containing a small proportion of free sulphur trioxide. The proportion of water in the sulphuric acid employed according to the present invention should not exceed 0.5-1% and preferably is not more than about 0.1-0.2%.

The conversion of the leuco compounds to the oxidised compounds is preferably effected by treating the leuco compounds with the substantially anhydrous sulphuric acid at high temperatures, e. g., temperatures of the order of 150° C.

The following example illustrates the invention but is not to be regarded as limiting it in any way:

A reaction vessel is charged with 10 parts of sulphuric acid monohydrate which contains not more than 0.1% of water, and one part of leuco 1, 4-diamino-anthraquinone. The mixture is raised to a temperature of 150° C. and maintained at this temperature for three hours. The contents of the reaction vessel are then transferred to a vat containing 110 parts of water and 20 parts of ice, whereupon the 1, 4-diamino-anthraquinone produced is precipitated. The precipitated dyestuff is filtered through a filter press and washed with water. The press cake is then returned to the vat and boiled for a few minutes with a further 110 parts of water and 1 part of soda ash. The dyestuff is then again filtered and well washed with water. An excellent yield is obtained.

The invention is applicable to the conversion from the leuco to the oxidised form of anthraquinone compounds which contain only those groups specified above and of anthraquinone compounds which also contain other substituent groups, e. g., other amino groups, hydroxy groups and sulphonic groups. Thus the invention may be applied, for example, to leuco 1, 4-diamino-anthraquinone referred to above, leuco 1-amino-4-hydroxy-anthraquinone, leuco 1, 4, 5-triamino-anthraquinone, leuco 1, 4, 5, 8-tetramino-anthraquinone, leuco 1, 4-diamino-5-hydroxy-anthraquinone and leuco 1, 4-diamino-5, 8-dihydroxy anthraquinone.

Having described our invention what we desire to secure by Letters Patent is:

1. Process for the conversion into oxidized form of leuco derivatives of anthraquinone compounds which contain an amino group in one of the 1- and 4-positions and a group selected from the group consisting of amino and hydroxy in the other of such positions, which comprises treating such leuco derivatives with substantially anhydrous sulphuric acid.

2. Process for the conversion into oxidized form of leuco 1, 4-diamino-anthraquinone, which comprises treating the said leuco derivative with substantially anhydrous sulphuric acid.

3. Process for the conversion into oxidized form of leuco derivatives of anthraquinone compounds which contain an amino group in one of the 1- and 4- positions and a group selected from the group consisting of amino and hydroxy in the other of such positions, which comprises treating such leuco derivatives with sulphuric acid which contains at most 0.2% of water.

4. Process for the conversion into oxidized form of leuco 1, 4-diamino-anthraquinone, which comprises treating the said leuco derivative with sulphuric acid which contains at most 0.2% of water.

5. Process for the conversion into oxidized form of leuco derivatives of anthraquinone compounds which contain an amino group in one of the 1- and 4- positions and a group selected from the group consisting of amino and hydroxy in the other of such positions, which comprises treating such leuco derivatives with sulphuric acid which contains free sulphur trioxide in an amount of not more than 0.1%.

6. Process for the conversion into oxidized form of leuco 1, 4-diamino-anthraquinone, which comprises treating the said leuco derivative with sulphuric acid which contains free sulphur trioxide in an amount of not more than 0.1%.

7. Process for the conversion into oxidized form of leuco derivatives of anthraquinone compounds which contain an amino group in one of the 1- and 4- positions and a group selected from the group consisting of amino and hydroxy in the other of such positions, which comprises treating such leuco derivatives with substantially anhydrous sulphuric acid at a temperature of about 150° C.

8. Process for the conversion into oxidized form of leuco 1, 4-diamino-anthraquinone, which comprises treating the said leuco derivative with sulphuric acid which contains at most 0.2% of water at a temperature of about 150° C.

9. Process for the conversion into oxidized form of leuco 1, 4-diamino-anthraquinone, which comprises treating the said leuco derivative with sulphuric acid which contains free sulphur trioxide in an amount of not more than 0.1% at a temperature of about 150° C.

GEOFFREY LORD.
GEORGE REEVES.